US011947912B1

(12) United States Patent
Dong et al.

(10) Patent No.: US 11,947,912 B1
(45) Date of Patent: Apr. 2, 2024

(54) NATURAL LANGUAGE PROCESSING

(71) Applicant: Amazon Technologies, Inc., Seattle, WA (US)

(72) Inventors: Shuyan Dong, Medford, MA (US); Zhichu Lu, Baltimore, MD (US); Yue Liu, Belmont, MA (US)

(73) Assignee: Amazon Technologies, Inc., Seattle, WA (US)

( * ) Notice: Subject to any disclaimer, the term of this patent is extended or adjusted under 35 U.S.C. 154(b) by 330 days.

(21) Appl. No.: 17/038,254

(22) Filed: Sep. 30, 2020

(51) Int. Cl.
*G06F 40/295* (2020.01)

(52) U.S. Cl.
CPC .................. *G06F 40/295* (2020.01)

(58) Field of Classification Search
None
See application file for complete search history.

(56) References Cited

U.S. PATENT DOCUMENTS

| | | | | |
|---|---|---|---|---|
| 9,190,055 | B1 * | 11/2015 | Kiss | G10L 15/063 |
| 11,604,925 | B1 * | 3/2023 | Lee | G06N 3/0442 |
| 2020/0192979 | A1 * | 6/2020 | Liu | G06F 18/2431 |
| 2021/0056169 | A1 * | 2/2021 | Bahirwani | G06F 40/295 |
| 2021/0374347 | A1 * | 12/2021 | Yang | G06N 7/005 |
| 2022/0188519 | A1 * | 6/2022 | Briody | G06N 3/08 |

OTHER PUBLICATIONS

Lample, Guillaume, Miguel Ballesteros, Sandeep Subramanian, Kazuya Kawakami, and Chris Dyer. "Neural architectures for named entity recognition." arXiv preprint arXiv:1603.01360 (2016). (Year: 2016).*

Févry, Thibault, Livio Baldini Soares, Nicholas FitzGerald, Eunsol Choi, and Tom Kwiatkowski. "Entities as experts: Sparse memory access with entity supervision." arXiv preprint arXiv:2004.07202 (2020). (Year: 2020).*

Wang et al., 2020. Pyramid: A Layered Model for Nested Named Entity Recognition. In Proceedings of the 58th Annual Meeting of the Association for Computational Linguistics, pp. 5918-5928, Online. Association for Computational Linguistics. (Year: 2020).*

Guo, Jiafeng, Gu Xu, Xueqi Cheng, and Hang Li. "Named entity recognition in query." In Proceedings of the 32nd international ACM SIGIR conference on Research and development in information retrieval, pp. 267-274. 2009. (Year: 2009).*

* cited by examiner

*Primary Examiner* — Frank D Mills
(74) *Attorney, Agent, or Firm* — K&L Gates LLP

(57) ABSTRACT

Devices and techniques are generally described for determining named entity recognition tags. In various examples, first input data representing a natural language input may be determined. In some examples, a first machine learned model may determine first data comprising a first encoded representation of the first input data. In various examples, second data representing a grouping of text of the first input data may be determined based at least in part on the first data. In some examples, first entity data may be determined by searching a memory layer using the second data. In at least some examples, the first entity data and the first data may be combined to generate third data. In various examples, output data comprising a predicted named entity recognition tag may be generated for the grouping of text based at least in part on the third data.

21 Claims, 9 Drawing Sheets

NATURAL LANGUAGE PROCESSING

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. An intent data processing application (often referred to as a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
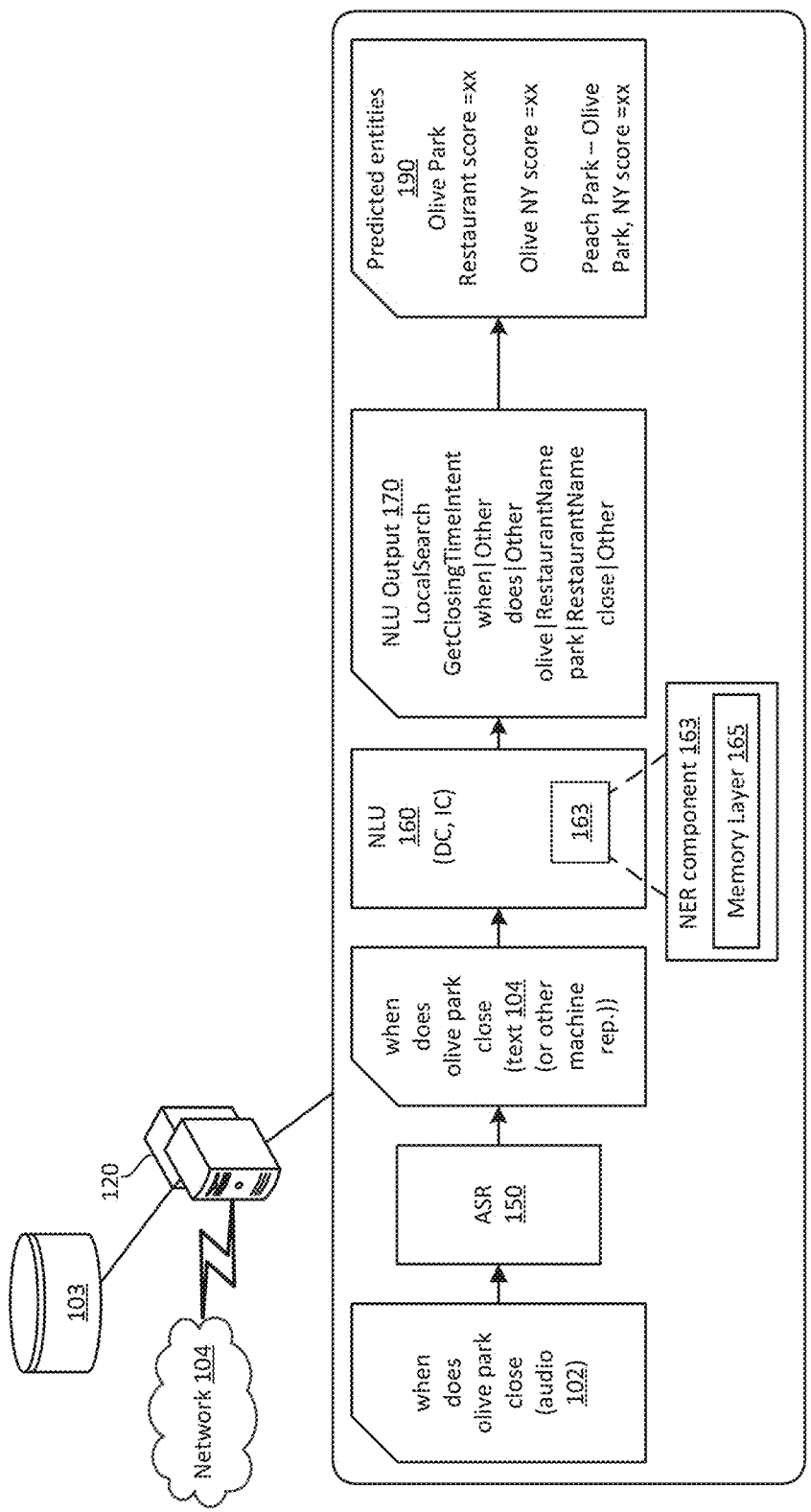
FIG. 1 is a block diagram illustrating example components of natural language processing system that may be used to predict entity data for a natural language input, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into data (e.g., text or other machine representation data) representative of the words in the speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

NLU processing may include an intent classification process by which intent data is determined that represents the intent (e.g., goal) of the input natural language data (e.g., text). Intent data may be sent to a skill that may, in turn, perform some action based on the intent data. In some examples, NLU processing may further include named entity recognition (NER), which is a technique used to identify and segment named entities in text data and to categorize the named entities into various predefined classes. Categorization of named entities into such classes is often referred to as "tagging" the named entities. In this context, "NER tags" are metadata that designates a particular class to a named entity. In text, named entities refer to terms that represent real-world objects such as people, places, organizations, locations, etc., which are often denoted by proper nouns.

In some examples, NLU processing may include entity resolution (ER). Entity resolution refers to disambiguation of an entity (e.g., a named entity in text) according to records stored in memory (e.g., in a database). For example, if text includes the proper noun "London," ER may be used to perform disambiguation to determine whether to link the named entity to a database entry for London in Ontario or a database entry for London in the United Kingdom. In various examples, the NER classes may be used during ER processing to disambiguate between multiple entities.

The intent data and the entity data may be used to perform an action that corresponds to the natural language input. For example, a user may state "Computer, play Band X." ASR may transform audio data representing the user's utterance into text data. NLU processing may determine that the text data invokes the <PlayMusic> intent. In this example, the <PlayMusic> intent may be effective to cause a skill (e.g., a music player application) to play songs. NER processing may be used to tag the text "Band X" with the NER tag metadata {artist name}. ER processing may determine a particular artist corresponding to Band X (e.g., in a knowledge base). For example, there may be a visual artist and a music artist called Band X. Accordingly, ER processing may disambiguate between the visual artist and the music artist to select the appropriate entity. Thereafter, the intent data <PlayMusic> and the entity data may be sent to the music player skill to cause music by the artist Band X to be played.

NER and ER processing errors can result in disappointing user experiences. For example, errors that continually misidentify a location name (e.g., where a user requests navigation directions to a particular location), song name, book title, etc., may be frustrating to a user (e.g., a user of a voice interface). An NER and/or ER processing error may result in the user repeating themselves and/or manually selecting the appropriate entity, leading to a frustrating user experience.

One source of ER error is error propagation from an upstream NER component. NER component errors include span errors, type errors, or both span and type errors. As used herein a "span" refers to a grouping of text and/or data representing text (e.g., tokens, sub-tokens, etc.). Below is an example of the input text "when does olive park close" with correct NER processing, NER processing that has resulted in a span error, and NER processing that has resulted in a type error.

Correct: when|Other does|Other olive|RestaurantName park|RestaurantName close|Other Span Error: when|Other does|Other olive|Other parkges-taurantName close|Other Type Error: when|Other does|Other olive|PlaceType park|PlaceType close|Other In the examples above, an NER tag has been added to each token. In the "Correct" example, both "olive" and "park" have been identified as a single span (as both "olive" and "park" are consecutive tokens tagged with the NER tag RestaurantName). In the example, "olive park" may refer to a restaurant called Olive Park. Accordingly, since the tokens olive and park refer to the name of a restaurant, PlaceName may be the appropriate NER tag for these terms.

In the Span Error example, the token "olive" has been classified with the NER tag "Other," while "park" has been classified with the NER token "RestaurantName." Accordingly, since the consecutive tokens olive and park—which pertain to the same entity—have been placed in separate spans (having different NER tags) there is a span error.

In the Type Error example, the tokens "olive" and "garden" have been identified as a single span (as both "olive" and "park" are consecutive tokens tagged with the same NER tag). However, the NER tag may not be correct, as PlaceType may not be the correct classification for the name of the restaurant (e.g., "Olive Park").

NER processing is prone to such errors in two main contexts. First, depending on the intent and the context of an entity, the same entity string can be tagged differently. In the previous example, the correct annotation has "olive park" tagged as RestaurantName. However, there is another interpretation where "olive" is a city (e.g., Olive, New York) and "park" is a PlaceType, since there may be a park in the city of olive called "Olive Park." Such ambiguities present a challenge for typical NER/ER processing architectures. Second, rare entities (e.g., entities that are not well represented in the training data used to train machine learned models used by NER/ER processing) are often incorrectly tagged due to a lack of representation during model training.

In many NER/ER processing systems, ER processing occurs after NER processing. Accordingly, if there is an error in the classification tags generated by NER processing, the error may be propagated to ER processing and can lead to an incorrect entity being selected for the natural language input. In various examples described herein, ER signals (e.g., entity resolution data representing the final or intermediate output of entity resolution processing) representing entities predicted to be referred to in the natural language input are integrated into the NER processing architecture. Entity resolution data may represent a match between a known entity stored in memory and a given input query. Stated another way, the NER processing architectures described herein incorporate entity knowledge into the NER tagging to accurately predict NER tags for natural language inputs. In particular, entity information is modeled in an entity memory layer of an NER attention head of a pre-trained transformer machine learned model, as opposed to pre-training the language model with an entity information layer. The entity memory layer may be searched using span data representing the input utterance to retrieve entity embeddings that most closely match the input span data. Additionally, the architecture of the entity memory layer allows for a relatively small number of parameters to be retrieved during inference, increasing the capacity and scalability of the entity memory layer and the NER architecture, generally.

Natural language processing may be used in a variety of contexts, including in processing enabled devices (e.g., devices employing voice control and/or speech processing "voice assistants") and/or systems. Examples of natural language processing systems and/or voice-enabled personal assistants include the Sin system from Apple Inc. of Cupertino, California, voice-enabled actions invoked by the Google Assistant system from Google LLC of Mountain View, California, Dragon speech recognition software from Nuance Communications of Burlington, Massachusetts, the Cortana system from Microsoft of Redmond, Washington, the Alexa system from Amazon.com, Inc. of Seattle, Washington, etc.

Natural language processing enabled devices may include one or more microphones (e.g., far-field microphone arrays) used to transform audio into electrical signals. Natural language processing may then be performed, either locally by the natural language processing enabled device, by one or more other computing devices communicating with the speech processing enabled device over a network, or by some combination of the natural language processing enabled device and the one or more other computing devices. In various examples, speech processing enabled devices may include and/or may be configured in communication with speakers and/or displays effective to output information obtained in response to a user's spoken request or command, and/or to output content that may be of interest to one or more user's.

Storage and/or use of data related to a particular person or device (e.g., contextual data and/or any personal data) may be controlled by a user using privacy controls associated with a natural language processing enabled device and/or a companion application associated with a natural language processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A natural language-controlled computing system may respond to user request data by outputting content and/or performing one or more other actions, such as initiating communications (e.g., synchronous phone/video calls and/or asynchronous messaging), playing music, providing information, calling a taxi, displaying an image, controlling other devices, etc. Generally, input data received by the various speech processing systems and components described herein may comprise natural language input data. Natural language input data may be request data in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Natural language processing systems may be configured with multiple applications (e.g., thousands, tens of thousands, or more applications) that can be used to potentially respond to a user request. Applications may be referred to herein as "skills". Natural language processing systems may be effective to process spoken and/or textual natural language inputs to determine data representing a semantic interpretation of the inputs (e.g., intent data). Skills may include any application effective to receive inputs from a natural language processing system in order to take one or more actions based on those inputs. For example, a natural language processing system may include music skills, video skills, calendar skills, timer skills, general knowledge answering skills, game skills, device control skills, etc. As described herein, skills receive NLU data comprising slot data, entity data, and/or intent data, and are configured to determine one or more actions based on the slot data, entity data, and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

As previously described, in at least some examples, a "skill," "skill component," and the like may be software that is run by a third party to the herein disclosed speech processing system, without the third party provisioning or managing one or more servers for executing the skill. In such an implementation, the system may be triggered to run a skill in response to the third party calling the system via the Internet or a mobile application. Such implementation may include, but is not limited to, Amazon's AWS Lambda.

In various examples, a speech processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing a user utterance spoken after the wakeword) may be sent to speech processing computing component(s) for further speech processing (e.g., ASR, NLU, etc.). In various examples, the wakeword detection component may be used to distinguish between audio that is intended for the speech processing system and audio that is not intended for the speech processing system.

Machine learning techniques, such as those described herein, are often used to form predictions, solve problems, recognize objects in image data for classification, etc. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation. In various examples, the neural networks described herein for machine translation are deterministic.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Generally, in machine learning, an embedding (e.g., embedding data) is a mapping of a discrete, categorical variable to a vector of continuous numbers. In various examples, token embeddings may be generated to represent various text described herein for input into the various machine learning models described herein.

FIG. 1 is a block diagram illustrating example components of natural language processing system that may be used to predict entity data for a natural language input, according to various embodiments of the present disclosure. Natural language processing system 120 may include one or more computing devices effective to determine entity data referred to in a natural language input. Natural language processing system 120 may include fewer or additional components apart from those specifically shown and described in FIG. 1. For example, natural language processing system 120 may include one or more skills to which intent data and entity data may be sent in order to take an action requested by the natural language input data. Memory 103 may represent at least one non-transitory computer-readable memory storing instructions that are effective to implement one or more of the various techniques and/or machine learned models described herein. Additionally, memory 103 may store data described herein, such as one or more model parameters, query data, result data, training data, etc.

In the example depicted in FIG. 1, audio data 102 may be received representing the user question "When does Olive Park close?" In the example, a user may be asking the natural language processing system 120 for information about the closing time of a restaurant named "Olive Park." Although in the example depicted in FIG. 1, audio data is received, the various techniques described herein are equally applicable to other forms of natural language input data (e.g., text). The audio data 102 representing the user question may be received by the natural language processing system 120 and may be sent to ASR component 150. ASR component 150 may generate text data 104 representing the audio data 102. For example, ASR component 150 may generate the text "when does olive park close." Although text data 104 is described as an output of ASR component 150, in various other examples, different machine representations of the audio data 102 may be used. For example, numeric, machine-readable encodings of the audio data 102 may be generated by ASR component 150 as opposed to text data.

The text data 104 may be sent to NLU component 160. NLU component 160 may perform domain classification to determine a domain to which the text data 104 pertains. Domains may be, for example, broad classes of requested activities that may each be associated with their own NLU models and/or skills. For example, a shopping domain may include different intents relative to a music domain. In the example of FIG. 1, the text data 104 may be classified into a Local Search domain configured to provide information about entities that are local to a physical address associated with a natural language processing device receiving the natural language input and/or local to a specified location.

Additionally, NLU component 160 may determine intent data representing a semantic interpretation of the action being requested and/or the goal of the natural language input data. In the current example, the intent may be <GetClosingTime> intent, which may be specific to the shopping domain. Although depicted as separate components in FIG. 1, NER component 163, memory layer 165, and/or an ER component (not shown in FIG. 1) may conceptually be considered part of NLU processing, and thus may be considered part of NLU component 160 in some examples.

As described in further detail below, the NER component 163 may comprise a transformer-based language model (e.g., a bidirectional encoder representation from transformers (BERT) based sequence tagger, a generative pre-trained transformer (GPT), XLNet, etc.). Additionally, memory layer 165 may be used to provide entity information into the NER processing. However, instead of pretraining the transformer-based model with an entity memory layer, the memory layer 165 may be modeled in the NER fine tuning head. The architecture of the NER component 163 and the memory layer 165 is described in further detail below.

In the example of FIG. 1, after NER processing by NER component 163, the NLU output data 170 may comprise domain data (LocalSearch), intent data (GetClosingTimeIntent), and predicted NER tags for each token of the text data 104. In the example of FIG. 1, the text data 104 is tagged as follows:

when|Other does|Other olive|RestaurantName park|RestaurantName close|Other

As described in further detail below, entity data related to "olive park" may be retrieved from memory layer 165 during prediction of the NER tags. Accordingly, in the example of FIG. 1, the NER component 163 has correctly tagged each token of the span "olive park" as RestaurantName (as opposed to PlaceType, which might be selected for a park in a city called Olive, for example).

Predicted entity data 190 may be output (e.g., by a Softmax layer) indicating a score for each entity determined to be relevant to "olive park" and retrieved from memory layer 165. In various examples, the entity data with the highest score (e.g., a confidence score) may be selected and may be sent to a selected skill for further processing, together with the selected intent data. In the example of FIG. 1, the entity data indicating the restaurant "Olive Park" may have the highest score relative to scores for the city Olive, NY, and to a park called "Peach Park" located in the city of Olive, NY.

Figure 2:
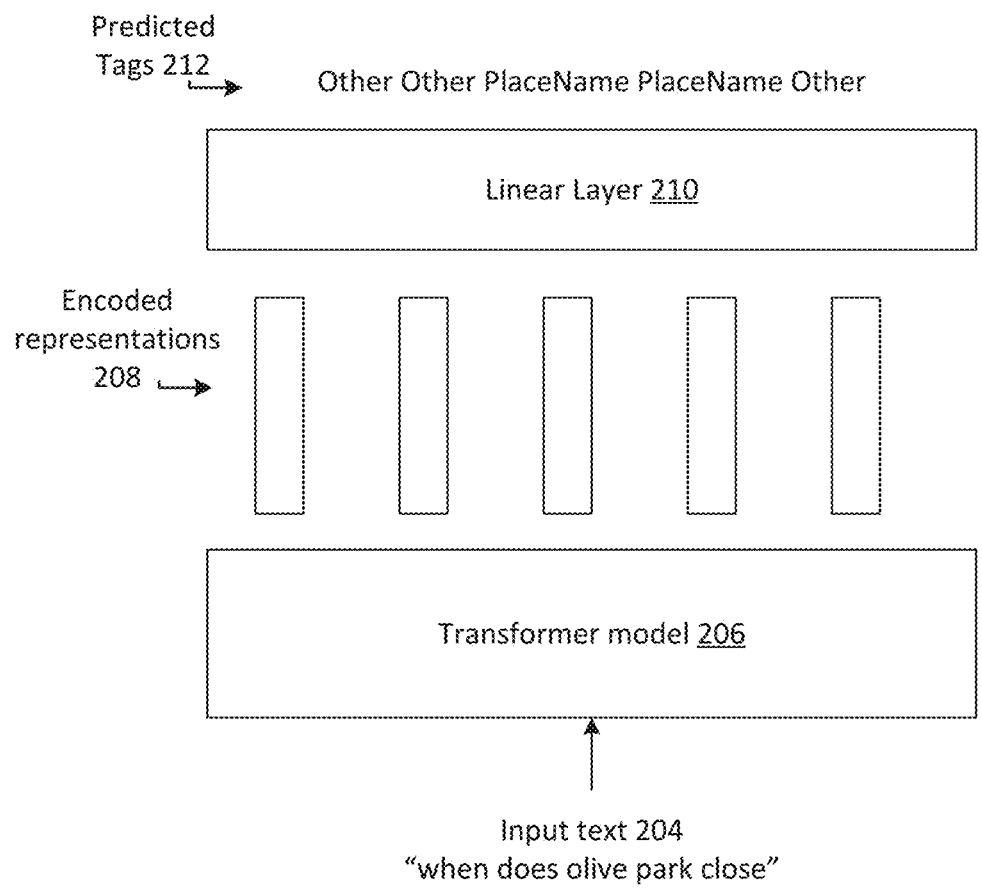
FIG. 2 is a block diagram illustrating a tagger model.

FIG. 2 is a block diagram illustrating a sequence tagger model in which input text 204 "when does olive park close"—is input into a transformer model 206. Transformer model 206 may be a pre-trained language model trained to generate encodings of the input text data in a latent feature space. Accordingly, encoded representations 208 may semantically and/or syntactically represent the input text 204.

The encoded representations 208 may be input into linear layer 210 (e.g., a linear machine learned layer) that may be trained to predict NER tags 212 for each input encoded representation 208. For example, an output layer of the linear layer 210 may generate confidence scores for each class of NER tag, for the input encoded representation 208. In various examples, the NER tags may be predicted for each token of input text 204. In at least some examples, a Softmax layer may be used to generate scores for each output NER tag. In various examples, in order to incorporate entity data, the transformer model 206 may be trained using such entity data. However, incorporating entity data into a model during training is cumbersome due to the large volume of training data that is typically incorporated into current language models. Additionally, training time for such large models may be exceedingly long—potentially taking weeks.

Figure 3:
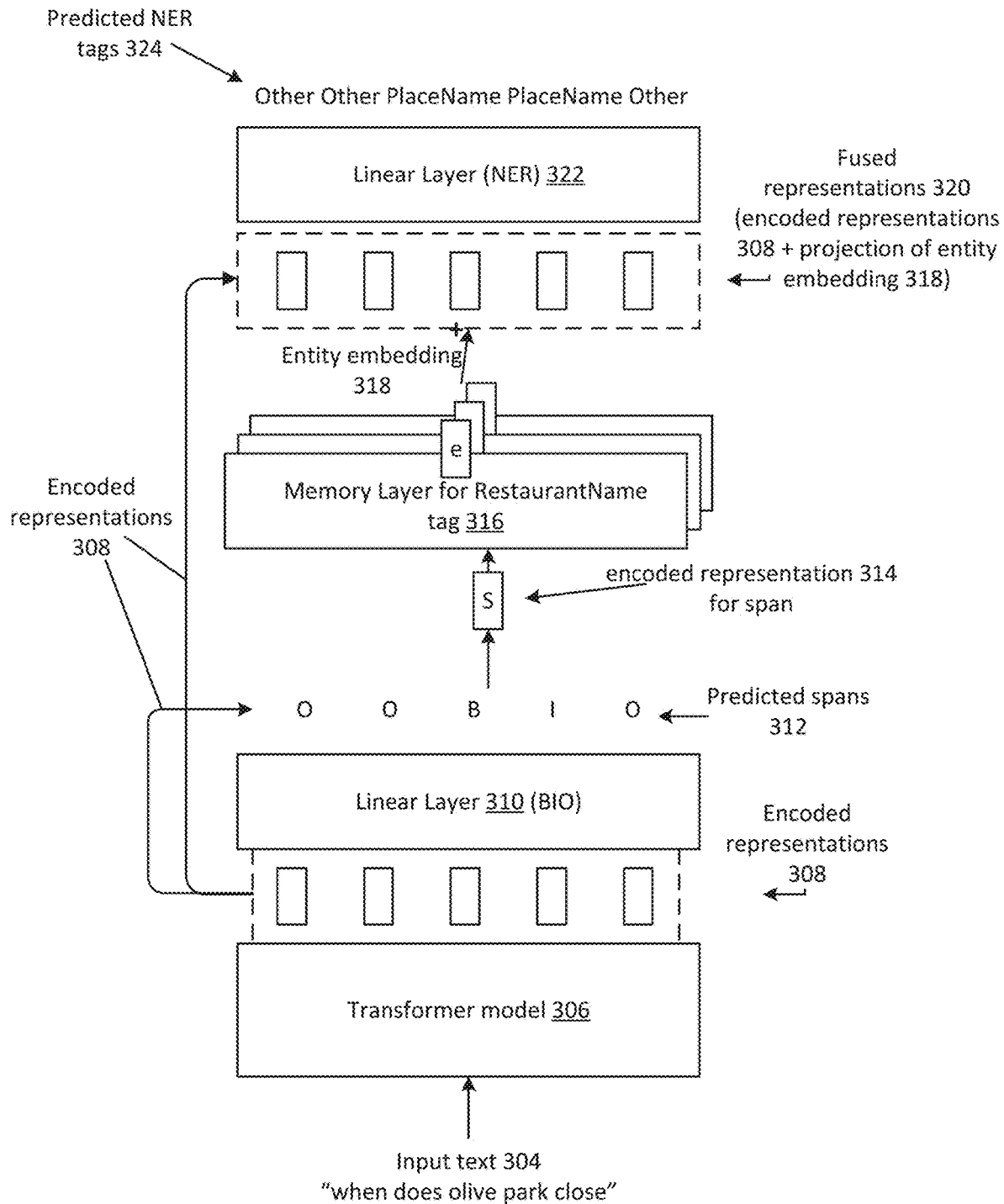
FIG. 3 is a block diagram illustrating an entity recognition tagging architecture incorporating entity data, in accordance with various embodiments described herein.

FIG. 3 is a block diagram illustrating an entity recognition tagging architecture incorporating entity data, in accordance with various embodiments described herein. Input text data 304 may be received representing an utterance. The example input text 304 is "when does olive park close." A transformer model 306 (e.g., a pre-trained BERT language model) may be used to generate encoded representations 308 of the input text 304. The encoded representations 308 may semantically represent the input text 304 in a multi-dimensional embedding space.

The encoded representations 308 may be input into a linear layer 310 that may be trained to detect spans in the input text 304 (e.g., using beginning-inside-outside (BIO) tagging). As previously described span data represents one or more groupings of the input text 304 (e.g., of tokens and/or sub-tokens of the input text 304). In BIO tagging, a B-tag (e.g., metadata associated with a token) indicates that the word/token is the beginning of a span (sometimes called a "chunk" in computational linguistics). An I-tag indicates that the word/token is inside a chunk. The B-tag is only used when a word/token is followed by a word/token of the same type without an O-tagged word/token being in between. An O-tag indicates that a token belongs to no span. Accordingly, the predicted spans 312 determined by linear layer 310 for the input text 304 is as follows:

when|O does|O olive|B park|I close|O as "olive" begins a span that also includes "park," but which does not include "close."

For each span (e.g., B-tagged "olive" and I-tagged "park"), an encoded representation 314 is determined. The encoded representation 314 represents the encoded representations 308 for "olive park." The encoded representation 314 may be used to retrieve the top-k entities from each memory layer 316. In various examples, there may be a memory layer 316 corresponding to each different NER tag (e.g., NER tags predicted by an output of linear layer 322). For example, there may be a memory layer 316 for the PlaceName NER tag. The top-k entities may be those entities in the memory layer 316 that most closely correspond to the encoded representation 314 for the span. During training, the embeddings for the query (e.g., encoded representation 314) may be learned to correspond to the vector representation for the corresponding entity data stored in the memory layer 316.

In various examples, entity embedding 318 may be a weighted average of the top-k entities retrieved from memory layer 316. In various examples, there may be a memory layer 316 for each tag type. For example, a first memory layer 316 may correspond to a RestaurantName NER tag, while a second memory layer 316 may correspond to a CityName NER tag, etc. A top-k entities may be retrieved from each of the memory layers 316 and the lists may be combined into a weighted top-k entities from among all memory layers 316. The lists may be combined by selecting the entities from each top-k entity list (e.g., from each memory layer 316) that most closely correspond to the encoded representation 314 for the input span. For example, the top 5 (or any other number) entity embeddings that are the closest to the encoded representation 314 (e.g., as determined using cosine similarity, Euclidean distance, etc.) may be selected from among the top-k entities returned from among the different memory layers 316. The output may be the entity embedding 318. The entity embedding 318 (e.g., a list of k entity data comprising the top-k closest entities determined using a key-value search) may be projected into the embedding space of the encoded representations 308 and may be added to the vector representing the encoded representations 308 to combine the entity representation signal with the encoded representations 308 representing the input text 304. In one example, projection into the embedding space may be performed using a linear layer trained to convert inputs of a first dimensionality (e.g., the number of dimensions of the entity embedding 318) into the dimensionality of the embedding space of the encoded representations 308. In some other examples, projection into the embedding space may be performed using techniques such as Sammon mapping, principal component analysis (PCA), etc. The combination of the entity embedding 318 and the encoded representations 308 may be referred to herein as fused representations 320.

In at least some examples, the memory layers 316 may be specific to a particular skill and/or domain of skills (e.g., a music domain, a shopping domain, etc.). For example, the input request data may request a skill by name. Accordingly, the memory layer 316 specific for the named skill may be loaded into memory and used during NER processing, as described herein. In some other examples, the memory layers 316 may be specific to a particular intent determined for the input request data.

The fused representations 320 may be input into a linear layer followed by Softmax to predict the NER tags 324. In various examples, the predicted NER tags 324 may be more accurate relative to previous NER taggers as the entity embedding 318 is used during prediction.

Figure 4:
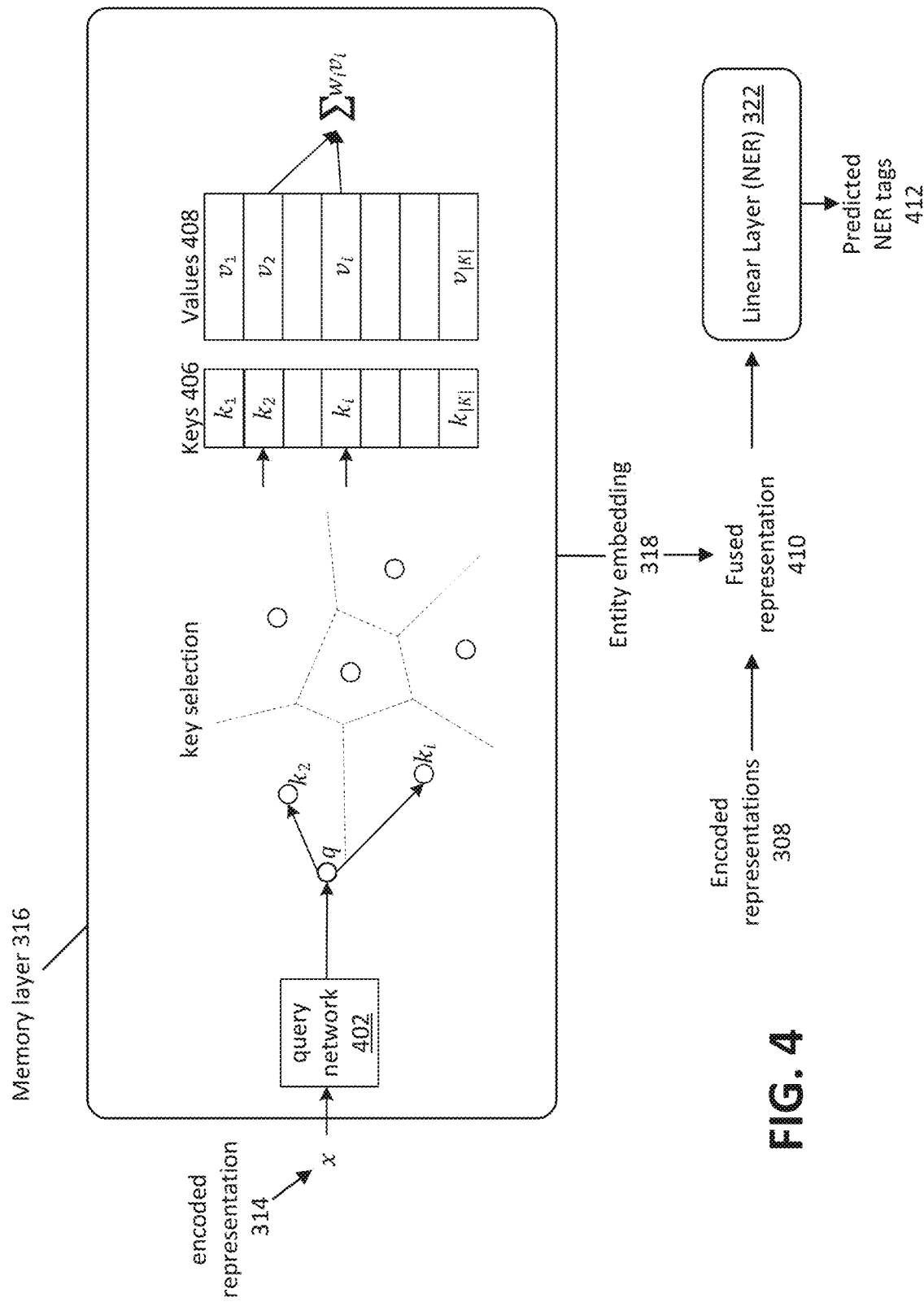
FIG. 4 is a block diagram of a memory layer that may be used to incorporate entity data into named entity recognition processing, in accordance with various aspects of the present disclosure.

FIG. 4 is a block diagram of a memory layer that may be used to incorporate entity data into named entity recognition processing, in accordance with various aspects of the present disclosure. Memory layer 316 may be implemented as an attention head of transformer model 306. Generally, in an attention head of a transformer model, given a query q and a set of key-value pairs (K, V), attention can be generalized to compute a weighted sum of the values dependent on the query and the corresponding keys. The query determines which values to focus on. In some examples, the query may be described as "attending to" the values. The memory layer(s) 316 may be searched to return entity embeddings 318 using a query/key/value architecture, as described below.

In the key-value memory layer 316 depicted in FIG. 4 there are K keys 406, and K values 408, both free parameters. Given an input (e.g., encoded representation 314), it is transformed into a query vector q by query network 402. The query data may represent a mapping of the encoded representation 314 in a latent space of lower dimensionality. The query vector q is used to compute the attention weight for each memory location. Query network 402 may compute the query vector $q_i$ by multiplying the input word embedding $x_i$ (e.g., encoded representation 314) by the query weights $W_Q$ (e.g., weight values). Similarly, a key vector $k_i$ may be computed as $k_i = x_i W_K$ and a value vector $v_i$ may be computed as $v_i = x_i W_V$. Attention weights may be calculated using the query and key vectors. For example, the attention weight $a_{ij}$ from token i to token j (e.g., in the input sentence and/or span) is the dot product between $q_i$ and $k_j$. This is referred to as dot-product attention. In various examples, the attention weights may be divided by the square root of the dimension of key vectors $\sqrt{d_k}$, which stabilizes gradients during training, and may be passed through a Softmax function to normalize the weights to sum to 1. The output of the attention head (e.g., memory layer 316) for token i is the weighted sum of the value vectors of all memory locations, weighted by $a_{ij}$, the attention from i to each other token stored in the different memory locations. In various examples, a variant may be employed where an attention-weighted average of the top k memory locations is used. The attention-weighted average of the top k memory locations may be the output entity embedding 318, since the values represent entities of the language model.

As previously described, the entity data may be projected into the same embedding space as the encoded representations 308 generated by transformer model 306 (representing the input) to generate fused representation 410. The fused representation 410 may be sent to a linear layer 322 that is trained to predict NER tags 412 for each token.

Figure 6:
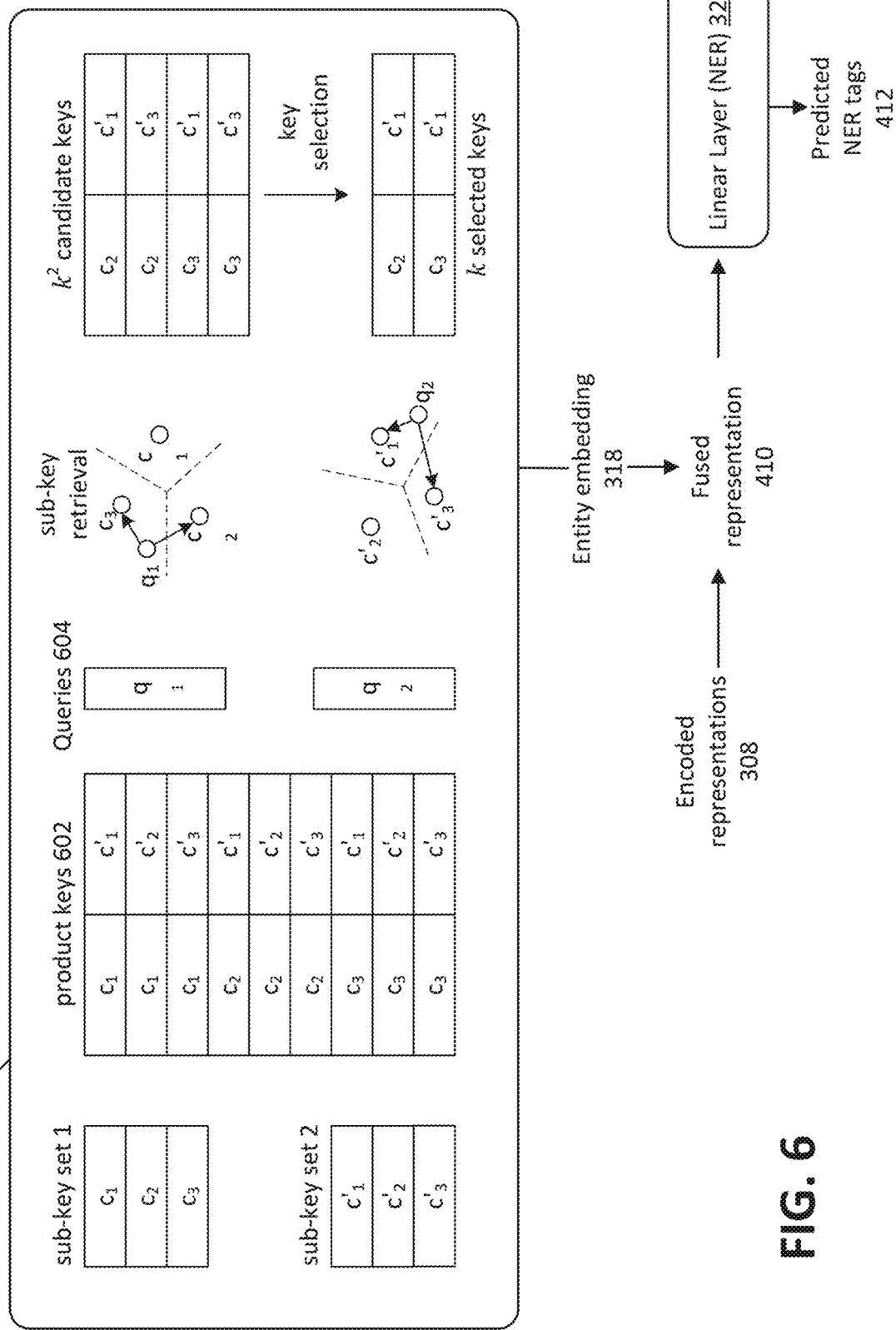
FIG. 6 is a block diagram of a memory layer that may use product keys to incorporate entity data into named entity recognition processing, in accordance with various aspects of the present disclosure.

In some examples, the retrieval time complexity of the memory layer 316 depicted in FIG. 4 may not scale well with the size of the memory K, which can be very large for a language model. Instead, the retrieval time complexity scales linearly with the memory size. Described below in reference to FIG. 6 is a product-key memory layers that increases the speed of retrieval.

Figure 5:
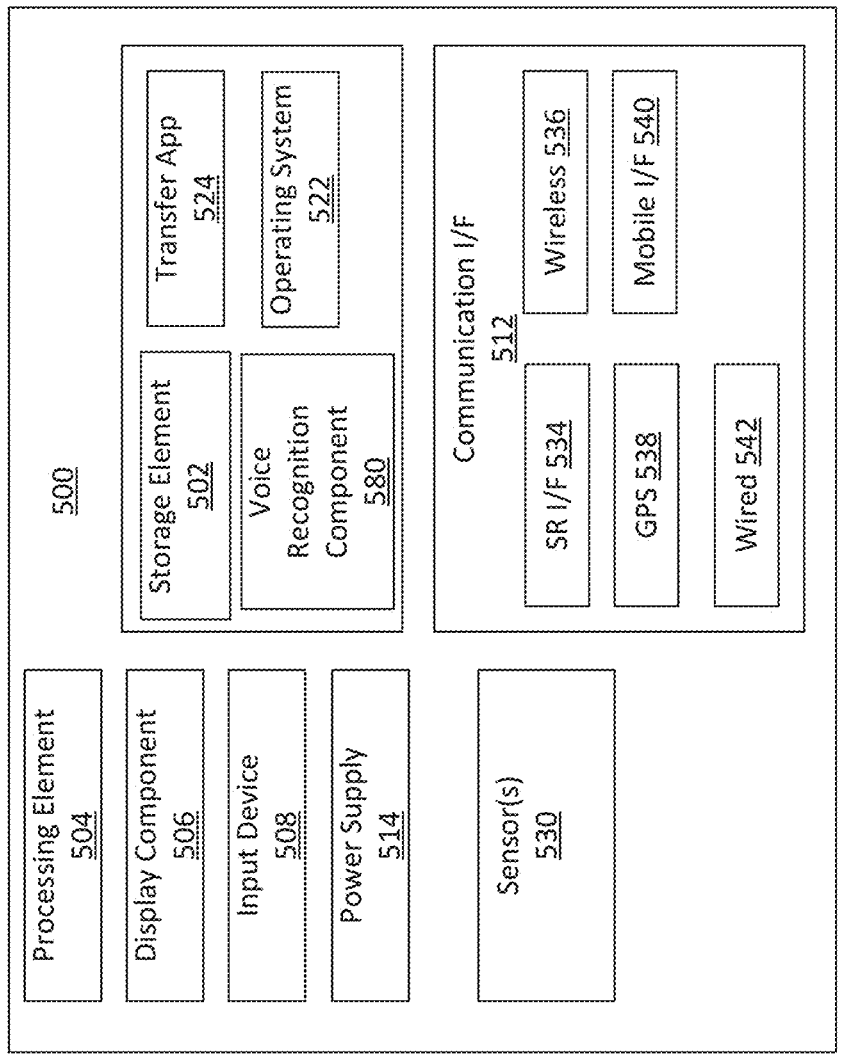
FIG. 5 is a block diagram showing an example system of a computing device that may be used in accordance with various embodiments described herein.

FIG. 5 is a block diagram showing an example system 500 of a computing device that may be used to implement, at least in part, one or more of the components described herein for prediction of NER tag data, in accordance with various aspects of the present disclosure. It will be appreciated that not all devices will include all of the components of the system 500 and some user devices may include additional components not shown in the system 500. The system 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs), tensor processing units, graphical processing units, etc. In some examples, the processing element 504 may be effective to determine a wakeword and/or to stream audio data to natural language processing system 120. The storage element 502 can include one or more different types of memory, data storage, or computer-readable storage media devoted to different purposes within the system 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the system 500 and various hardware thereof. A transfer application 524 may be configured to receive images, audio, and/or video from another device (e.g., a mobile device, image capture device, and/or display device) or from an image sensor and/or microphone included in the system 500. In some examples, the transfer application 524 may also be configured to send the received voice requests to one or more voice recognition servers (e.g., natural language processing system 120).

When implemented in some user devices, the system 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display content determined provided by a skill executed by the processing element 504 and/or by another computing device.

The system 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the system 500. These input devices 508 may be incorporated into the system 500 or operably coupled to the system 500 via wired or wireless interface. In some examples, system 500 may include a microphone or an array of microphones for capturing sounds, such as voice requests. A voice recognition component 580 may interpret audio signals of sound captured by microphone. In some examples, voice recognition component 580 may listen for a "wakeword" to be received by microphone 570. Upon receipt of the wakeword, voice recognition component 580 may stream audio to a voice recognition server for analysis, such as natural language processing system 120. In various examples, voice recognition component 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The system 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the system 500. A wired communication module 542 may be configured to communicate according to the USB protocol or any other suitable protocol. The system 500 may also include one or more sensors 530 such as, for example, one or more position sensors, image sensors, and/or motion sensors.

FIG. 6 is a block diagram of a memory layer 316 that may use product keys to incorporate entity data into named entity recognition processing, in accordance with various aspects of the present disclosure.

In memory layer 316 of FIG. 6, a product-key retrieval architecture may be used to increase the speed of retrieval. For example, instead of |K| keys of size D, the architecture of FIG. 6 may use two sets of $\sqrt{K}$ keys (e.g., sub-key set 1 and sub-key set 2) of size D/2 to implicitly represent a set of |K| keys. The set of |K| keys are implicitly represented by taking all combinations of (subkey from set 1, subkey from set 2) pairs, and concatenating each pair (e.g., product keys 602). Queries 604 may be generated and used to perform sub-key retrieval. KNN search in these implicitly defined keys is fast. Because of their construction, the top k subkeys from set 1 and top k subkeys from set 2 may be selected. $k^2$ combinations of the top k subkeys from set 1 and 2 may be determined. The top k candidate keys within the set of $k^2$ may be selected (e.g., k selected keys). The k closest implicit, full-size keys will be in those $k^2$ keys generated by taking combinations of the top k subkeys. This reduces the time complexity to $\sqrt{K}+k^2$.

Pre-trained Entity Embeddings

Entity embeddings (e.g., embeddings representing entity data in memory layer 316) may be trained for each entity in a given catalog/dataset using an objective function that encourages the representation to be close to its name representation and its predicted category representation (e.g., NER tag data). In various examples, an entity might have multiple categories and the training objective may encourage entity embeddings to be close to the embeddings of each of the categories.

Both name embeddings and category embeddings may be generated using a transformer-based encoder (e.g., BERT) and average pooling the representations. The objective may be defined as follows:

max(0, margin $-<e\_i, n\_i>+<e\_i, n\_neg>$) for neg!=i
max(0, margin $-<e\_i, c\_ik>+<e\_i, c\_neg>$) for all k for neg!=c_ik where margin is a hyper-parameter and i indexes the ith entity, ik indexes the kth category of the ith entity, and neg indexes negative samples.

Figure 7:
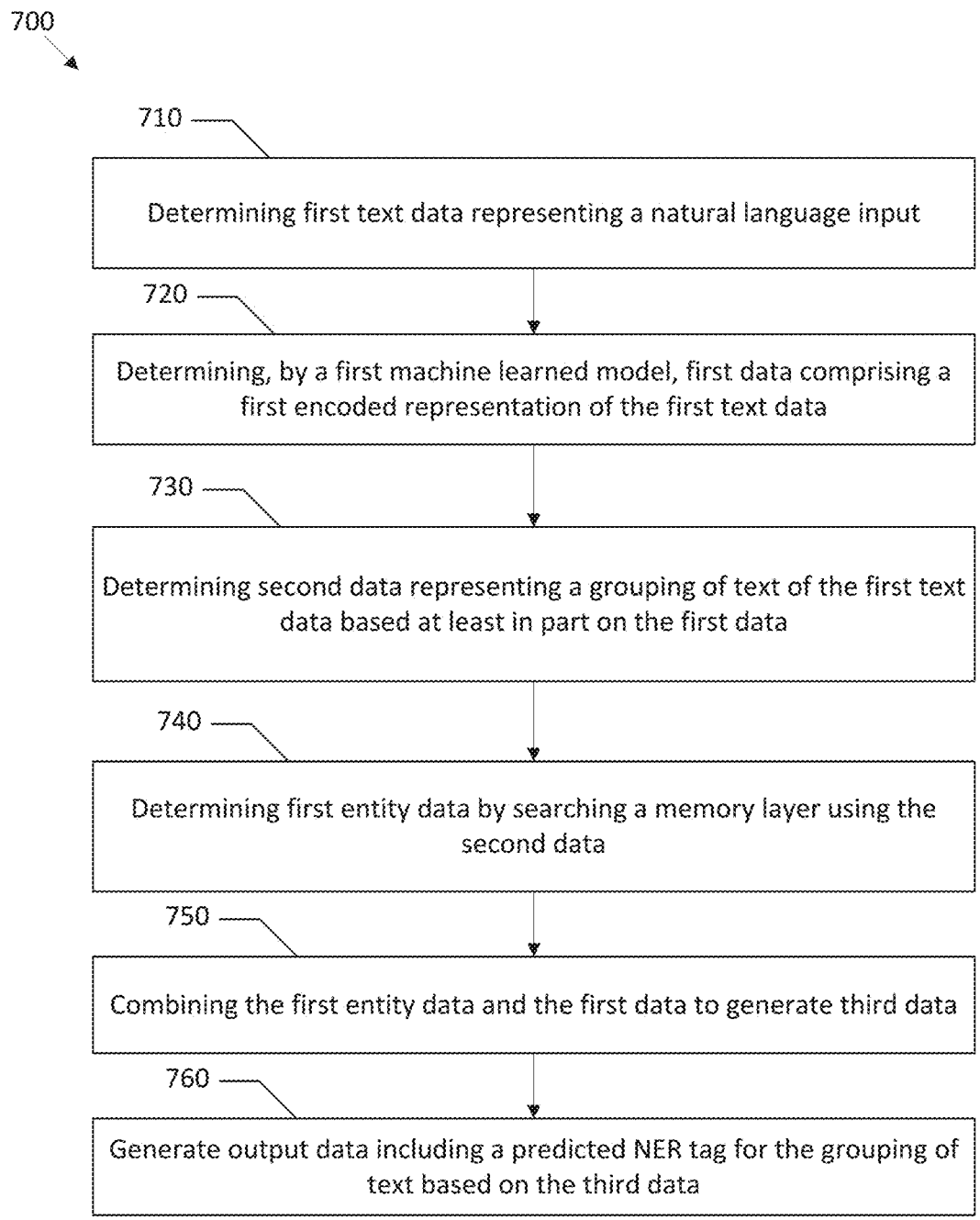
FIG. 7 is a flow chart illustrating an example process for generating NER tag data using entity data, according to embodiments of the present disclosure.

FIG. 7 is a flow chart illustrating an example process 700 for generating NER tag data using entity data, according to embodiments of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine code may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which first text data (and/or other types of input data, such as a numeric representation of a user request) representing a natural language input may be determined. In some examples, the first text data may be received as text, while in other examples, the first text data may be received from an ASR component (e.g., ASR component 150) configured to generate the first text data from input audio data representing a spoken command and/or request.

Process 700 may continue at action 720, at which a first machine learned model may determine first data comprising a first encoded representation of the first text data. At action 720, an encoded representation (e.g., a vector representation) of the first text data may be generated by a transformer model (e.g., transformer model 306). Transformer model 306 may use multi-headed attention to generate an encoded representation that semantically represents the input first text data.

Process 700 may continue at action 730, at which second data may be determined that represents a grouping of text of the first text data based at least in part on the first data. At action 730, spans may be detected in the first text data based on the encoded representations generated by the transformer model. Spans may be groupings of text comprising one or more words/tokens. In various examples, a linear layer 310 may be used to generate the span predictions. The linear layer may use BIO tagging to detect spans.

Process 700 may continue to action 740, at which first entity data may be determined by searching a memory layer using the second data. At action 740, the grouping of text (e.g., an encoded representation representing the span tag and the encoded representation for the token(s) in the span generated by the transformer model 306) may be used as an input to a memory layer 316. As previously described, memory layer 316 may be an attention head of a pre-trained transformer model (e.g., transformer model 306). Query data may be generated based on the span-tagged encoded representation (e.g., encoded representation 314 for span) and may be used to determine first entity data (e.g., entity embedding 318), as described above.

Process 700 may continue to action 750, at which the first entity data and the first data may be combined to generate third data. In various examples, a projection of the first entity data into the same multi-dimensional embedding space as the first data may be computed (e.g., using any of various known vector projection techniques such as Sammon mapping, PCA, zero padding, etc.). In various other examples, a linear layer (and/or other fully-connected layer) may be used to project the entity data into the same embedding space as the first data. Thereafter, the projection of the first entity data and the first data may be added (e.g., vector addition, concatenation, etc.) to generate augmented representation data (e.g., fused representation 410).

Process 700 may continue to action 760, at which output data may be generated including a predicted NER tag for the grouping of text based on the third data. The augmented representation data (e.g., fused representation 410) may be input into a linear layer trained to predict NER tags for each fused representation 410. In various examples, the fused representation 410 represents the original span of tokens along with the entity data determined from the memory layer 316. Accordingly, the NER tag is predicted on the basis of entity information as well as on the basis of the semantic representation of the input text as generated by the transformer model.

Figure 8:
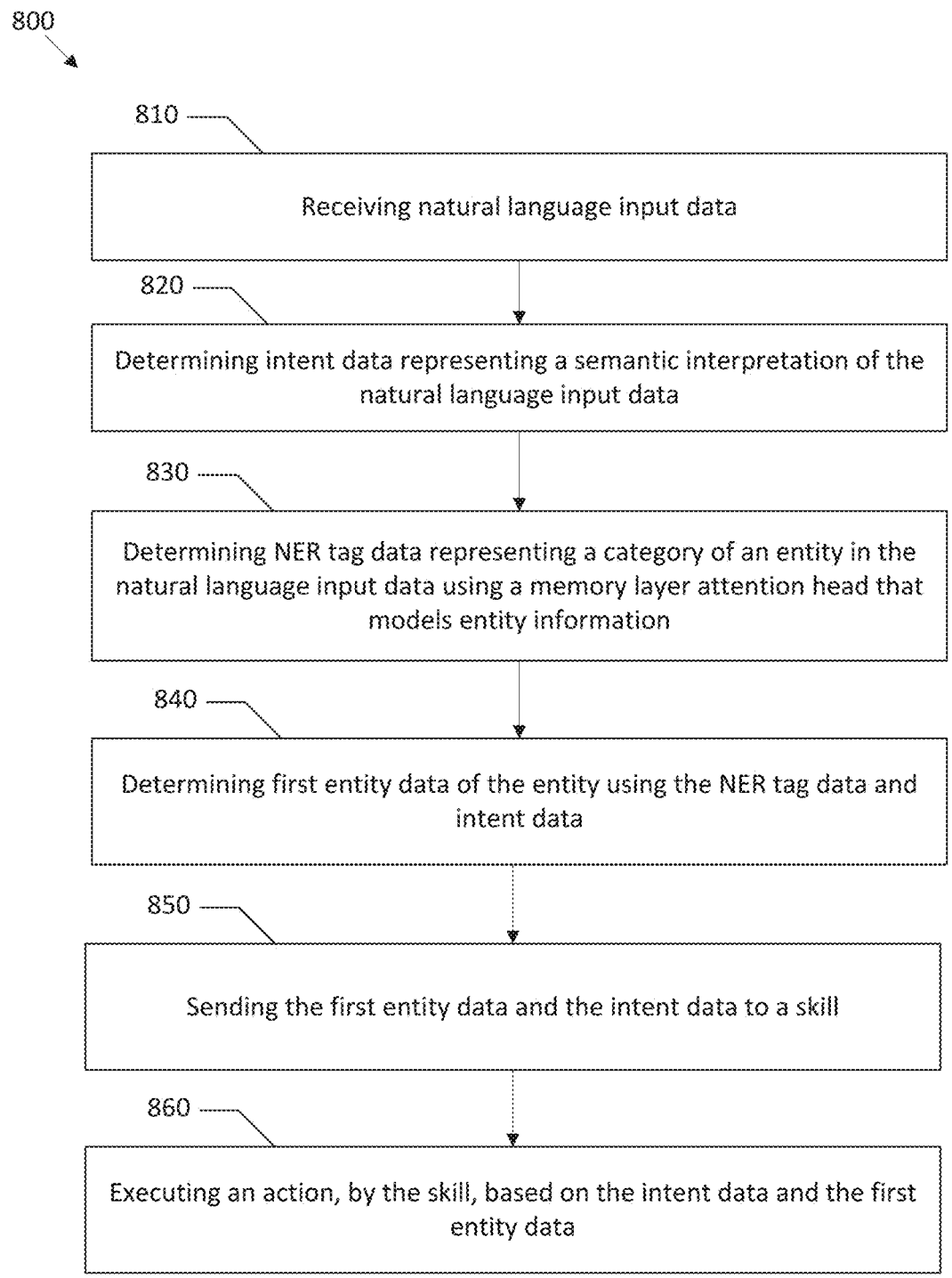
FIG. 8 is a flow chart illustrating an example process for determining an action in response to a natural language input, according to various embodiments of the present disclosure.

FIG. 8 is a flow chart illustrating an example process 800 for determining an action in response to a natural language input, according to embodiments of the present disclosure. Those portions of FIG. 8 that have been previously discussed in reference to FIGS. 1-7 may not be described again for purposes of clarity and brevity. The actions of the process 800 may represent a series of instructions comprising computer-readable machine code executable by one or more processing units of one or more computing devices. In various examples, the computer-readable machine code may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 800 may begin at action 810, at which natural language input data may be received. The natural language input data may be received as text and/or as a spoken command and/or request. In various examples, if the natural language input data is audio data representing a spoken command and/or request, ASR processing may be performed to determine text data representing the natural language input.

Processing may continue at action 820, at which intent data representing a semantic interpretation of the natural language input data may be determined. NLU component 160 may determine the intent data. The intent data may represent a goal and/or intention of the natural language input data. Additionally, NLU processing may determine slots in the natural language input, which may be filled with entity data. As described in further detail below, the intent data may be sent to a skill that may be configured to execute an action corresponding to the intent data. Additionally, other parameters may be passed into the skill to carry out the action. For example, if the input natural language data is "Play Movie X," the intent data may be a {PlayMovie} intent that may be executed by a movie player skill. Similarly, "Movie X" may be a slot in the natural language input describing an entity called "Movie X" (e.g., the name of a movie). NER processing and/or ER processing may be used to determine the appropriate entity which may be passed as movie data to the skill. Accordingly, the skill may be effective to execute the appropriate action on the relevant entity (e.g., playing Movie X).

Processing may continue to action 830, at which NER tag data may be predicted for the natural language input. The NER tag data may represent a category of an entity in the natural language input data. The NER tag data may be determined using a memory layer attention head (e.g., memory layer 316) that models entity information, as described above. In the above example, the slot data comprising the tokens Movie X may be determined. NER processing may predict the tag "MovieName" for the tokens Movie X.

Processing may continue to action 840, at which first entity data of the entity may be determined using the NER tag data and the intent data representing a semantic interpretation of the natural language input data. At action 840, the appropriate entity may be selected using entity resolution. In various examples, the entity resolution may be determined using the NER tag data predicted at action 830 and intent data determined at action 820.

Processing may continue to action 850, at which the first entity data and the intent data may be sent to a skill. At action 850, the intent data and the first entity data may be sent to a skill that has been selected to carry out the request/command represented by the natural language input. The skill may be selected as described below in reference to the natural language processing system routing architecture of FIG. 9.

Processing may continue to action 860, at which the action may be executed by the skill. The action may correspond to the intent data (e.g., the {PlayMovie} intent may be effective to initiate video playback). The first entity data may be a parameter of the function effective to carry out the action. For example, the first entity data may identify the particular movie to be played, song to be played, item to be purchased, the particular person for which requested information is to be provided, etc.

Figure 9:
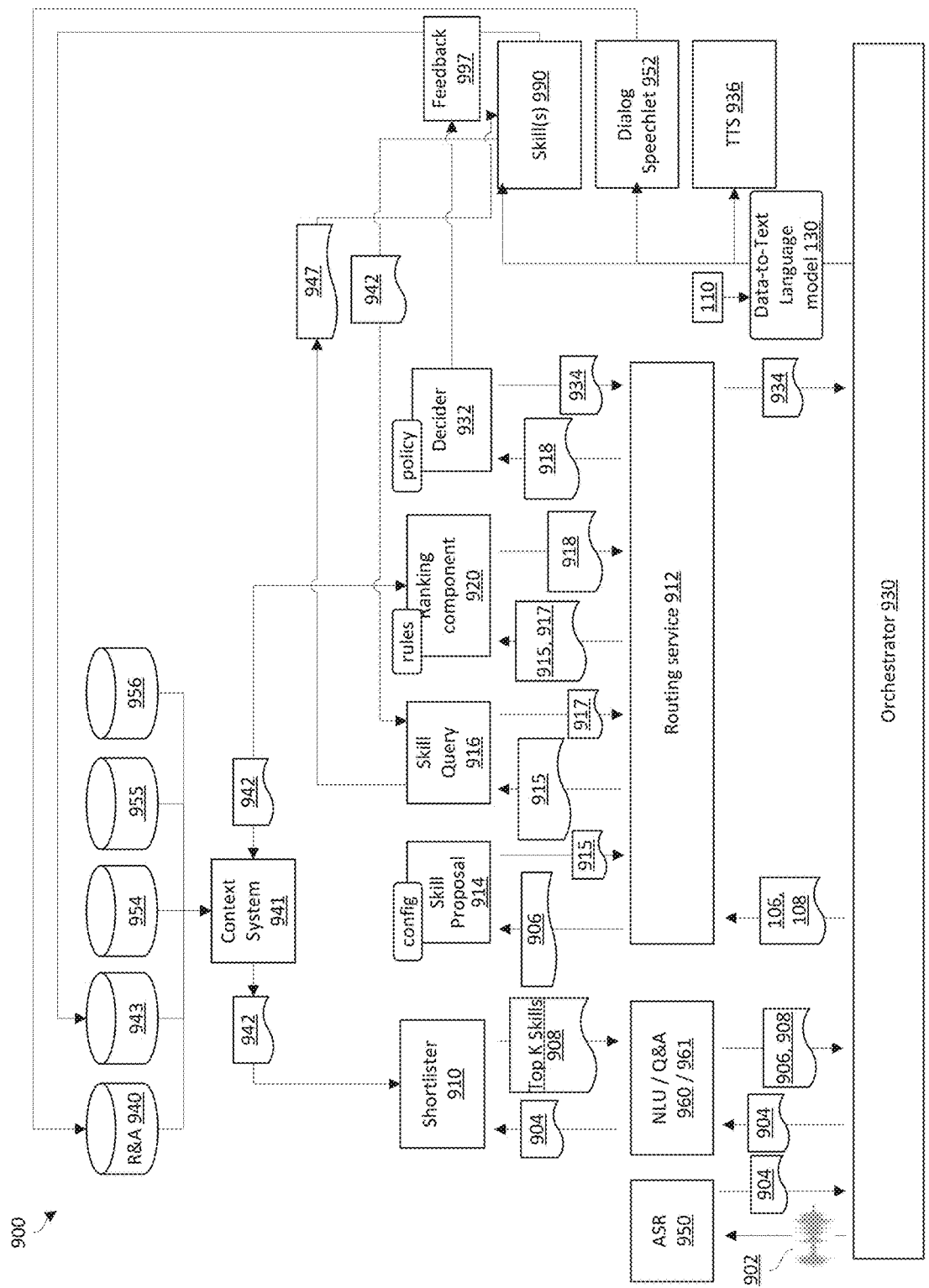
FIG. 9 is a block diagram illustrating an example routing architecture for a natural language processing system, according to various aspects of the present disclosure.

FIG. 9 is a block diagram illustrating an example routing architecture for a speech processing system 900, according to various aspects of the present disclosure. In various examples, the speech processing system may generate structured data (e.g., a meaning representation such as the triple data described above) and may use the system 100, including the data-to-text language model 130 and/or the semantic fidelity classifier 110 to generate semantically faithful natural language text that may be output by a text to speech component (e.g., TTS component 936). For example, a question and answer component (e.g., Q&A component 961) may generate triple data representing an answer to a user's question. The system 100, including the data-to-text language model 130 and/or the semantic fidelity classifier 110 may generate semantically accurate text representing the triple data and the TTS component 936 may output the semantically accurate text.

The various components illustrated FIG. 9 may be located on the same or different physical devices. Communication between various components illustrated in FIG. 9 may occur directly or across a network. A speech processing-enabled device may capture audio using an audio capture component, such as one or more microphone(s). The speech processing enabled device may send audio data 902 (e.g., corresponding to an utterance) to an orchestrator 930 of the speech processing system 900. The speech processing enabled device may also send metadata (e.g., including device identifiers, device type data, contextual data, IP address data, room location data, etc.) to the orchestrator 930. The components depicted in FIG. 9, including components of a speech processing system may be generally referred to as spoken language processing components, a speech processing system 900 a spoken language processing system, speech processing components, and/or a speech processing routing system. Additionally, in various examples, the components depicted in FIG. 9 may process written input (e.g., text data) in addition to spoken input.

Upon receipt by the speech processing system 900, the audio data 902 may be sent to an orchestrator 930. The orchestrator 930 may include memory and logic that enables the orchestrator 930 to initiate a dialog session and to transmit various pieces and forms of data to various components of the system, as described in further detail below.

The orchestrator 930 may send the audio data 902 to an ASR component 950 (e.g., a speech recognition component). The ASR component 950 may transcribe the audio data 902 into one or more hypotheses representing speech contained in the audio data 902. The ASR component 950 interprets the speech in the audio data based on a similarity between the characteristics of the audio data corresponding to the speech and pre-established language models. For example, the ASR component 950 may compare the audio data 902 with models for sounds (e.g., subword units such as phonemes) and sequences of sounds to identify words that match the sequence of sounds in the speech represented in the audio data 902. The ASR component 950 may send text data 904 generated thereby to orchestrator 930 that may, in turn, send the text data 904 to NLU component 960 and/or question and answer component 961. As previously described, the text data 904 may include one or more ASR hypotheses. The text data 904 may include a top scoring hypothesis of the speech represented in the audio data 902 or may include an N-best list including a group of hypotheses of the speech represented in the audio data 902, and potentially respective ASR processing confidence scores. As previously described, in some other examples, the ASR component 950 (and/or other components of the speech processing system 900) may generate other metadata associated with the utterance such as an overall utterance confidence score, per-word (e.g., per token) confidence scores for the utterance, utterance duration, stream duration (e.g., duration of the stream of audio data from speech processing enabled device to speech processing system 900), a number of tokens output by ASR, etc.

The NLU component 960 attempts to make a semantic interpretation of the phrases or statements represented in the text data input therein. That is, the NLU component 960 determines one or more meanings associated with the phrases or statements represented in the text data 904 based on individual words represented in the text data 904. The NLU component 960 interprets a text string to derive an intent of the user (e.g., an action that the user desires be performed) as well as pertinent pieces of information in the text data that allow a device (e.g., the speech processing enabled device, the speech processing system 900, a computing device(s) implementing a skill, etc.) to complete the intent. For example, if the text data 904 corresponds to "Set temperature to 74 degrees," the NLU component 960 may determine the user intended to invoke a climate intent with a target temperature value slot of 74 degrees Fahrenheit. As previously described, in addition to the NLU intent and slot data, the NLU component 960 may generate other metadata associated with the utterance (e.g., with the audio data 902). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant skill, intent, and/or slot), entity recognition confidence scores, entity recognition match types (e.g., exact match, prefix match, suffix match, etc.), etc. Herein, the data output by the NLU component 960 (depicted in FIG. 9 as "NLU 960") is referred to as NLU output data 906.

Additionally, NLU 960 may implement the various NER and/or ER processing techniques described herein to determine the relevant entity described in a given natural language input. In particular, NLU 960 may employ a transformer-based NER architecture that uses a memory layer attention head to model entity information, as described herein.

In some examples, text data 904 may be sent to a question and answer (Q&A) component 961 that may use one or more knowledge bases and/or knowledge graphs to answer a question represented in the text data 904. In various examples, the question may request information about a particular entity that may be identified using NER/ER processing. In at least some examples, the question and answer component 961 may determine an answer to the question in parallel with processing of the text data 904 by NLU component 960. In various examples, the question and answer component 961 may be configured to output structured data (e.g., a meaning representation) representing an answer to a question present in the text data 904. For example, the answer to a question may comprise triple data including a subject, object, and predicate, as described herein. However, in some examples, the meaning representation may be other structured data, apart from triple data, as known to those skilled in the art. In various examples, the data-to-text language model 130 (and the semantic fidelity classifier 110) may generate semantically accurate text data from the structured data output by the question and answer component 961. The text data may thereafter be output by text to speech component 936. In various examples, the decider 932 and/or the ranking component 920 may determine whether the output from the question and answer component 961 or the NLU output data 906 is more likely to address a particular user input.

NLU component 960 may send the text data 904 and/or some of NLU output data 906 (such as intents, recognized entity names, slot values, etc.) to a shortlister 910. The shortlister 910 may comprise one or more machine learning models that may be effective to predict a subset of skills that are most likely to be able to correctly process the input data, based on the input of the text data 904 and/or the NLU output data 906. In addition, the shortlister 910 may call the ranking and arbitration component 940 to request features pre-computed by the ranking and arbitration component 940 according to features used as inputs by the machine learning models of shortlister 910. As previously described, the shortlister 910 may define source data used to compute the features and/or may specify functions used to generate the features from the source data (e.g., formulae and/or functions) prior to runtime processing of input data. The ranking and arbitration component 940 may precompute the features according to the specified feature definitions supplied by shortlister 910 and by the other components of speech processing system 900 and may store the precomputed features in memory. Ranking and arbitration component 940 may generate indexes that may be used to retrieve the precomputed features during runtime (e.g., through an API). Accordingly, during runtime processing, shortlister 910 may retrieve the precomputed features from ranking and arbitration component 940 and may use the precomputed features (among other inputs) to predict a subset of skills that are most likely to be appropriate to process the current input data. In some examples, in addition to predicting a subset of skills, shortlister 910 may predict whether or not question and answer service 961 is likely to generate an appropriate response to the current input data. Accordingly, shortlister 910 may send the top K skills 908 to NLU component 960.

NLU component 960 may thereafter perform skill-specific NLU processing (and/or question-and-answer processing by question and answer component 961) for the skills in the top K skills 908 to determine skill-specific intents, slots, and/or named entities. NLU output data 906 may include such skill-specific data (e.g., skill-specific N-best hypotheses).

Ranking and arbitration component 940 may communicate with various systems in order to obtain source data used to precompute features. For example, ranking and arbitration component 940 may communicate with feedback storage 943 to receive user feedback data (e.g., explicit and/or implicit user feedback related to user satisfaction with processing of input data). In various examples, the user feedback data may be user-specific and/or device specific and may indicate whether a user was satisfied or not satisfied with a particular interaction with speech processing system 900. As previously discussed, in various examples user feedback data may be predicted for input data prior to processing the input data using a skill 990. In various examples, user feedback data may be used to pre-compute various features used by machine learning models of speech processing system 900. Accordingly, in some examples, the skills selected for processing particular input data may be determined based at least in part on skills that a user (or a group of similar users) has responded positively to in the past.

Additionally, ranking and arbitration component 940 may communicate with endpoint context system 954, which may provide context data at the conclusion of a user interaction with the speech processing system 900. In another example, ranking and arbitration component 940 may communicate with skill data 956 to determine information from the skill regarding past interactions with the skill and/or data acquired by the skill. Additionally, ranking and arbitration component 940 may communicate with other data sources 955, as new services are added and/or as new data types that may be useful for routing prediction are made available. In addition to ranking and arbitration component 940 using context data 942 to precompute features used by various machine learning models of the routing architecture of the speech processing system 900, a context system 941 may receive the context data 942. The context system 941 may provide the context data directly to both ranking and arbitration component 940 as well as to various components of the routing architecture of speech processing system 900. For example, the context system 941 may send context data 942 to shortlister 910 and/or ranking component 920 in order to determine a shortlist of skills 990 for particular input data and/or in order to rank the shortlisted skills.

NLU output data 906 (which may, in some examples, include question and answer output data) and top K skills 908 may be sent by NLU component 960 to orchestrator 930. Orchestrator 930 may send the top K skills 908 and the NLU output data 906 to routing service 912. Routing service 912 may send the top K skills 908 and NLU output data 906 to skill proposal component 914. Skills 990 may subscribe to particular intents using skill proposal component 914. Accordingly, skill proposal component 914 may receive the NLU output data 906 and may determine whether any of the included intents correspond to one or more of skills 990. If so, skill proposal component 914 may generate candidate data comprising <Intent, Skill> candidate pairs 915. The candidate pairs 915 may be sent to routing service 912 and may be sent by routing service 912 to skill query service 916. Skill query service 916 comprises an API through which skills 990 may "opt out" of particular requests. For example, a skill 990 may comprise a video playback skill.

Accordingly, the skill 990 may register with skill query service 916 to indicate that only requests made on a device with a display screen should be routed to the particular skill 990. In addition, skills 990 may communicate availability information, pricing information, and/or other structured descriptions of how and under what circumstances (e.g., determined using context data) the skill 990 can fulfill a request represented by the current input data. Skill query service 916 may send a signal 917 indicating what skills can fulfill a particular request (and/or what skills are unable to fulfill the request). The signal 917 may be sent to routing service 912. Routing service 912 may send the signal 917 along with the candidate pairs 915 to a ranking component 920. As depicted in FIG. 9, skills 990 may send context data 942 to skill query service 916 to indicate situations in which a skill may opt out of processing a particular request (e.g., if the device sending the input data does not include a display screen, etc.). In various examples, the context data 942 sent by skills 990 to skill query service 916 may be skill and/or request specific context data. Additionally, skill query service 916 may send intent requests 947 to skills 990.

Ranking component 920 may include one or more statistical machine learning models effective to rank the candidates included in candidate pairs 915. In order to rank the candidate pairs 915, ranking component 920 may generate confidence scores for each corresponding candidate pairs 915. A confidence score may indicate that the corresponding skill 990 and/or intent of the candidate pair is appropriate to process the request. Ranking component 920 may compute features using the candidate pairs 915 and signal 917 in order to predict the ranking of the skills 990 included in the candidate pairs 915. The features computing during processing of the input data (sometimes referred to as "runtime features") may comprise a feature representation of the list of candidate pairs 915 and/or a representation of the signal 917. Additionally, ranking component 920 may query ranking and arbitration component 940 for precomputed features that have been defined for use by ranking component 920. As previously described, the precomputed features may be determined based on contextual data, user feedback data, past usage data, skill data, previous rankings of ranking component 920, etc. Additionally, ranking component 920 may compute runtime features using context data 942, user feedback data from feedback storage 943, and/or other data sources. In various examples, the loss function for the machine learning models of ranking component 920 may optimize based on user satisfaction scores computed using user feedback data from feedback storage 943.

Ranking component 920 may generate a ranked list 918 of the candidate skills indicated in candidate pairs 915. In at least some examples, the ranking component 920 may use a deep neural network as a machine learning model for determining the ranked list 918. In some examples, ranking component 920 (and/or some other speech processing system 900 component, such as decider engine 932) may determine plan data that may override the ranked list 918 such that a lower ranked skill among the candidate pairs 915 may be selected for processing the input data. In various examples, the confidence scores for skill-specific interpretations may be used by ranking component 920 to generate the ranked list. As such, candidate pairs that include skill-specific NLU interpretations with high confidence scores may be more highly ranked by ranking component 920, in some examples.

In another example, the decider engine 932 may store policies that may control whether or not explicit user feedback is solicited (e.g., via TTS) after the completion of an action (e.g., by the top-ranked skill determined by the ranker component). Explicit feedback may be solicited through the dialog speechlet 952 prior to routing input data to a skill for processing. In another example, decider engine 932 may control feedback component 997 to request explicit feedback from a user post-skill processing (e.g., via TTS). In various examples, feedback component 997 may ask the user whether or not the user was satisfied with the action taken by the speech processing system 900. In yet another example, an exploration policy defining a dynamic routing adjustment may send input data that matches predicate data defined using the dynamic routing adjustment component to a newly-implemented skill 990. The decider engine 932 may determine that the top ranked result from the ranking component 920 should be ignored due to the dynamic routing adjustment being performed by the dynamic routing adjustment component. Additionally, in some examples, a policy of the decider engine 932 may be to solicit explicit feedback from the user whenever a new skill is routed to due to a dynamic routing adjustment. Accordingly, at the completion of the action, the decider engine 932 may control TTS to inquire as to whether the user was satisfied with the interaction with the new skill and/or whether the performed action was the action intended by the user.

Decider engine 932 may output plan data that comprises a routing plan 934 for processing the input data. The routing plan 934 may define a target skill 990 (and/or may identify that question and answer component 961) to process the input data. As described above, the target skill 990 may be selected as the top-ranked hypothesis determined by the ranking component 920. In some other examples, the decider engine 932 may select a target skill 990 based on a policy, as described above. In some examples, the ranking component 920 may determine that two different skills are equally applicable for processing the input data. In such examples, the decider engine 932 may determine that disambiguation should occur. Accordingly, the routing plan 934 may include sending the input data to a dialog speechlet 952 that may output (via TTS) one or more questions (e.g., a disambiguation request) used to prompt the user to disambiguate between the two equally likely (or approximately equally likely) interpretations of the input data. For example, it may be unclear, based on a user's request, whether the user intended to invoke a movie playback skill or a music playback skill, as a movie and a soundtrack for the movie may be identified using the same name. Accordingly, the decider engine 932 may determine that the top two hypotheses of ranking component 920 are equally likely (or approximately equally likely) and may determine that a question should be asked to disambiguate between the two possible actions. Accordingly, the routing plan 934 may route the input data to the dialog speechlet 952, and the dialog speechlet 952 may inquire whether the user intended to play the movie or the soundtrack.

In another example, the decider engine 932 may determine that the user was not satisfied with the top hypothesis of the ranking component 920 (e.g., due to explicit or implicit feedback received from the user in response to taking an action associated with the top ranking component 920 hypothesis). Accordingly, the decider engine 932 may determine that the routing plan 934 should be to determine the second highest ranked hypothesis of the ranking component 920.

The intent data, entity data, contextual data, and/or other metadata may be sent to the selected skill 990. The skill 990 may be effective to carry out some action based on the intent data, entity data, contextual data, etc. If a skill 990 outputs natural language text in response to processing, the orchestrator may send the text to TTS component 936 for output as audio representing the speech.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving, by a natural language processing system, first natural language data representing an utterance;
   generating, by an automatic speech recognition component, first text data representing the first natural language data;
   generating, by a transformer model, first embedding data comprising a first vector representation of the first text data in an embedding space, wherein the first embedding data encodes the first text data as a plurality of tokens;
   determining first span data for the first embedding data, the first span data defining a grouping of one or more tokens of the plurality of tokens;
   generating query data representing the first span data;
   determining first entity data for the first span data by searching a memory layer using the query data;
   determining second embedding data representing the first entity data by modifying the first entity data to have the same number of dimensions as the embedding space;
   generating third embedding data by combining the first embedding data and the second embedding data;
   determining named entity recognition (NER) tag data representing a predicted category of a portion of the first text data represented by the first span data, the NER tag data being generated using the third embedding data; and
   determining, by an entity resolution (ER) component, an entity referred to by the utterance, the entity being associated with the predicted category.

2. The method of claim 1, further comprising:
   adding a second vector representation of the second embedding data to the first vector representation to generate a third vector in the embedding space, the third embedding data comprising the third vector, the third vector representing the first text data and the first entity data;
   inputting the third vector into a linear machine learned layer trained to predict NER tags; and
   determining, from an output layer of the linear machine learned layer, the NER tag data.

3. The method of claim 1, further comprising:
   determining a list of k entity data for the first span data by searching the memory layer using the query data, wherein the k entity data comprises a top-k closest entities determined using a key-value search; and
   determining the first entity data as a weighted average of the k entity data.

4. A method comprising:
   determining first input data representing a natural language input;
   determining first data that is a first encoded representation of the first input data;

determining second data representing a grouping of a portion of the first input data based at least in part on the first data;

determining first entity embedding data from a first plurality of entity embeddings and using the second data, wherein the first plurality of entity embeddings are associated with a first class of named entities;

determining second entity embedding data from a second plurality of entity embeddings and using the second data, wherein the second plurality of entity embeddings are associated with a second class of named entities; and generating third data using the first entity embedding data, the second entity embedding data, and the first data.

5. The method of claim 4, further comprising:
determining third entity embedding data from a third class of named entities different from the first class and the second class; and
aggregating the first entity embedding data, the second entity embedding data, and the third entity embedding data to generate the third data.

6. The method of claim 5, further comprising:
determining third entity embedding data representing at least the first entity embedding data in an embedding space shared by the first data; and
concatenating the third entity embedding data and the first data to generate the third data.

7. The method of claim 4, further comprising:
generating query data representing the second data;
determining, from a set of keys, a first subset of the set of keys corresponding to the query data;
determining, from the set of keys, a second subset of the set of keys corresponding to the query data;
concatenating a first key from the first subset and a second key from the second subset to determine a product key; and
determining the first entity embedding data based at least in part on a comparison of the query data to the product key.

8. The method of claim 4, further comprising determining the first entity embedding data based on a weighted average of the first plurality of entity embeddings retrieved from the first class of named entities.

9. The method of claim 4, further comprising:
generating, using a transformer model, the first data in a first embedding space;
determining fourth data representing the first entity embedding data in the first embedding space; and
generating the third data by adding a first vector of the first data and a second vector of the fourth data.

10. The method of claim 4, further comprising:
sending the third data to a linear layer of a machine learning model;
determining, by the linear layer, a first confidence score for a first named entity recognition tag for the third data;
determining, by the linear layer, a second confidence score for a second named entity recognition tag for the third data; and
generating output data comprising predicted named entity recognition data based at least in part on the first confidence score and the second confidence score.

11. The method of claim 4, further comprising:
determining, using the first plurality of entity embeddings and the second data, third entity embedding data and a first weight value associated with the third entity embedding data;

determining, using the first plurality of entity embeddings and the second data, fourth entity embedding data and a second weight value associated with the fourth entity embedding data;

determining a first product of the third entity embedding data and the first weight value;

determining a second product of the fourth entity embedding data and the second weight value; and determining the first entity embedding data based at least in part on a sum of the first product and the second product.

12. The method of claim 4, further comprising:
generating query data representing the second data by mapping the second data to a latent space of lower dimensionality; and
determining the first entity embedding data by comparing the query data to a set of product keys of the first plurality of entity embeddings.

13. The method of claim 4, further comprising combining the first entity embedding data, the second entity embedding data, and the first data to generate the third data, wherein the third data is used to generate predicted named entity recognition data.

14. A system comprising:
at least one processor; and
at least one non-transitory computer-readable memory storing instructions that, when executed by the at least one processor, are effective to:
determine first input data representing a natural language input;
determine first data that is a first encoded representation of the first input data;
determine second data representing a grouping of a portion of the first input data based at least in part on the first data;
determine first entity embedding data from a first plurality of entity embeddings and using the second data, wherein the first plurality of entity embeddings are associated with a first class of named entities;
determine second entity embedding data from a second plurality of entity embeddings and using the second data, wherein the second plurality of entity embeddings are associated with a second class of named entities; and
generate third data using the first entity embedding data, the second entity embedding data, and the first data.

15. The system of claim 14, wherein the at least one non-transitory computer-readable memory stores further instructions that, when executed by the at least one processor, are further effective to:
determine third entity embedding data from a third class of named entities different from the first class and the second class; and
aggregate the first entity embedding data, the second entity embedding data, and the third entity embedding data to generate the third data.

16. The system of claim 15, wherein the at least one non-transitory computer-readable memory stores further instructions that, when executed by the at least one processor, are further effective to:
determine third entity embedding data representing at least the first entity embedding data in an embedding space shared by the first data; and
concatenate the third entity embedding data and the first data to generate the third data.

17. The system of claim 14, wherein the at least one non-transitory computer-readable memory stores further instructions that, when executed by the at least one processor, are further effective to:
- generate query data representing the second data;
- determine, from a set of keys, a first subset of the set of keys corresponding to the query data;
- determine, from the set of keys, a second subset of the set of keys corresponding to the query data;
- concatenate a first key from the first subset and a second key from the second subset to determine a product key; and
- determine the first entity embedding data based at least in part on a comparison of the query data to the product key.

18. The system of claim 14, wherein the at least one non-transitory computer-readable memory stores further instructions that, when executed by the at least one processor, are further effective to determine the first embedding entity data based on a weighted average of the first plurality of entity embeddings retrieved from the first class of named entities.

19. The system of claim 14, wherein the at least one non-transitory computer-readable memory stores further instructions that, when executed by the at least one processor, are further effective to:
- generate, using a transformer model, the first data in a first embedding space;
- determine fourth data representing the first entity embedding data in the first embedding space; and
- generate the third data by adding a first vector of the first data and a second vector of the fourth data.

20. The system of claim 14, wherein the at least one non-transitory computer-readable memory stores further instructions that, when executed by the at least one processor, are further effective to:
- send the third data to a linear layer of a machine learning model;
- determine, by the linear layer, a first confidence score for a first named entity recognition tag for the third data;
- determine, by the linear layer, a second confidence score for a second named entity recognition tag for the third data; and
- generate output data comprising predicted named entity recognition data based at least in part on the first confidence score and the second confidence score.

21. The system of claim 14, wherein the at least one non-transitory computer-readable memory stores further instructions that, when executed by the at least one processor, are further effective to:
- determine, using the first plurality of entity embeddings and the second data, third entity embedding data and a first weight value associated with the third entity embedding data;
- determine, using the first plurality of entity embeddings and the second data, fourth entity embedding data and a second weight value associated with the fourth entity embedding data;
- determine a first product of the third entity data and the first weight value;
- determine a second product of the fourth entity embedding data and the second weight value; and
- determine the first entity embedding data based at least in part on a sum of the first product and the second product.

\* \* \* \* \*